(12) United States Patent
Reeder et al.

(10) Patent No.: US 6,415,579 B1
(45) Date of Patent: *Jul. 9, 2002

(54) WINDOW, MUNTIN AND METHOD

(76) Inventors: Steven L. Reeder, 3075 Stokes Ferry Rd.; Michael A. Reeder, 4930 Millbridge Rd., both of Salisbury, NC (US) 28146

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/407,034

(22) Filed: Sep. 27, 1999

Related U.S. Application Data (62) Division of application No. 08/957,498, filed on Oct. 24, 1997, now Pat. No. 5,980,667.

(51) Int. Cl.[7] .................................................. E06B 3/68
(52) U.S. Cl. .................... 52/786.13; 52/456; 52/204.6; 52/730.3; 52/734.2
(58) Field of Search .................... 52/204.5, 204.61, 52/204.6, 311.3, 656.5, 730.3, 734.2, 456, 786.1, 786.13

(56) References Cited

U.S. PATENT DOCUMENTS

| | | | | | |
|---|---|---|---|---|---|
| 3,946,531 A | * | 3/1976 | Armstrong | .................... | 52/456 |
| 4,222,210 A | * | 9/1980 | Hanstein et al. | ............... | 52/461 |
| 4,783,938 A | * | 11/1988 | Palmer | ........................ | 52/171.3 |
| 4,989,384 A | * | 2/1991 | Kinghorn et al. | ............. | 52/456 |
| 5,088,307 A | * | 2/1992 | Cole | ............................ | 72/46 |
| 5,099,626 A | * | 3/1992 | Seeger | ........................ | 52/314 |
| 5,456,048 A | * | 10/1995 | White | ..................... | 52/204.61 |
| 5,657,590 A | * | 8/1997 | Digman et al. | .......... | 52/204.61 |
| 5,899,033 A | * | 5/1999 | Merchlewitz | ............ | 52/204.61 |
| 6,311,455 B1 | * | 11/2001 | Gerard | ....................... | 52/786.1 |

* cited by examiner

Primary Examiner—Carl D. Friedman
Assistant Examiner—Jennifer I. Thissell
(74) Attorney, Agent, or Firm—McGuireWoods LLP (57) ABSTRACT

A non-metal window muntin formed from plastic or wood is described for use in hermetically sealed insulated glass windows. The process for forming the muntin includes machining polystyrene sheets which are painted with a latex pain and baked prior to use between sealed glass of the window.

13 Claims, 3 Drawing Sheets

WINDOW, MUNTIN AND METHOD

CROSS REFERENCE TO RELATED APPLICATION

This is a divisional application of application Ser. No. 08/957,498 filed Oct. 24, 1997, entitled WINDOW, MUNTIN AND METHOD, now U.S. Pat. No. 5,980,667.

BACKGROUND OF THE INVENTION

1. Field of the Invention

This invention pertains to a decorative window muntin contained between two hermetically sealed panes of glass and a method for making the same.

2. Description of the Prior Art and Objectives of the Invention

In recent years, glass making and installing has progressed to allow large panes of window glass to be installed, whereas, previously, small panes were individually framed and supported within a window structure known by those in the industry as true divided lite (TDL). This TDL arrangement became unnecessary with utilization of large panes. For example, whereas, previously, a one meter by one meter window glass may have been made of nine individual panes of glass, now one pane is used.

While the science of glass and window making was advancing to allow larger panes of glass to be used, similar advances occurred in energy efficient windows, and hermetically sealed insulated glass windows have become increasingly popular. Such windows have parallel spaced panes of glass to provide insulation and increase energy conservation. These windows are commonly referred to as having insulated glass (IG) as two normal panes of glass are combined to form one pane of IG.

In an effort to make the appearance of the new IG windows match older windows, decorative muntins formed from metal are placed between the panes of glass in IG. These muntins do not provide any support; they are purely decorative. In this manner the IG windows look like TDL windows while providing the insulative properties desired by today's window owners and fabricators.

Problems sometimes arise in IG windows as strong sunlight or heated temperatures raise the temperature inside the sealed glass. Moisture in the muntin vaporizes and often recondenses on the inside surface of the glass pane, causing a fog-like effect which "clouds" the glass. Because the glass is sealed, cleaning or rubbing will not remove this clouding. The escape of moisture or liquid from the muntin is commonly referred to as "outgassing" and has been the cause of much dissatisfaction in the window fabrication and installation industry. Likewise, this problem has required the replacement of many IG windows which become opaque with moisture.

While outgassing is less of a problem with conventional aluminum muntins, another problem arises in the manufacture of aluminum muntins for use in IG windows. Aluminum can be difficult to bend using present technology, and some shapes are just not possible to create using aluminum. This is important in oddly shaped windows. Where aluminum can be used, it is frequently a multipiece assembly which raises manufacturing and assembly costs.

Other problems arise in the expansion and contraction of conventional muntins as they undergo temperature changes in installed windows. Some muntins expand too rapidly when heated and buckle within the IG. At other times when the expanded muntin attempts to contract, the warp or buckle has become permanent and is unsightly.

Therefore with these and other problems known, it is an objective of the present invention to provide a muntin for use in an IG window which does not cause or allow outgassing.

It is a further objective of the present invention to provide a muntin within an IG window which is pleasing to the consumer's eye.

It is still a further objective of the present invention to provide a muntin which is easy to manufacture through the use of Computer Aided Design (CAD) tools.

It is another objective to provide a muntin with low expansion characteristics and which has high memory.

It is yet another objective to provide an abrasive resistant muntin which is inexpensive to manufacture.

It is still a further objective to provide a one piece muntin that is ready to be placed within a window without additional assembly steps.

It is yet a further objective to provide a method of making a muntin with the above described characteristics.

Various other objectives and advantages of the invention will become readily apparent to those skilled in the art upon further reference to the detailed description below.

SUMMARY OF THE INVENTION

The aforesaid and other objectives are realized by a window muntin machined from a non-metal material, preferably polystyrene, although polyurethane or wood may be acceptable, which is easily machined using CAD. technology. The machined muntin is painted with a latex paint and baked until the moisture is removed and the paint has dried. The baked muntin is then placed between two panes of glass and hermetically sealed therein as is usual in the art. This glass unit is then available for mounting in a conventional window assembly.

DETAILED DESCRIPTION OF THE PREFERRED EMBODIMENTS AND OPERATION OF THE INVENTION

Figure 1:
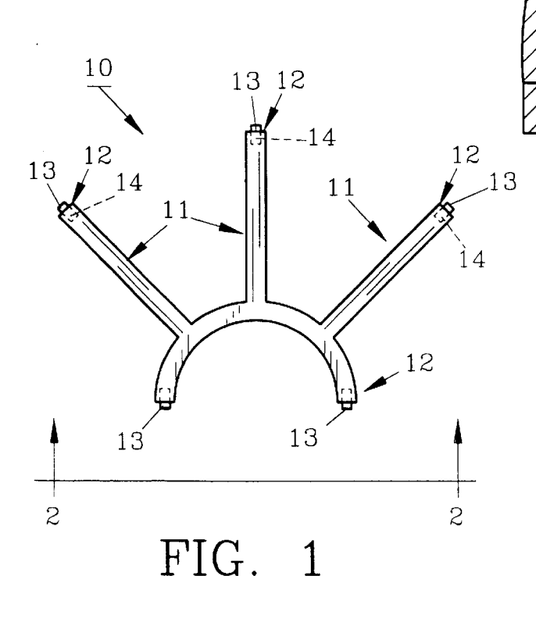
FIG. 1 shows a front elevational view of the preferred embodiment of the decorative muntin of the invention.
Figure 2:
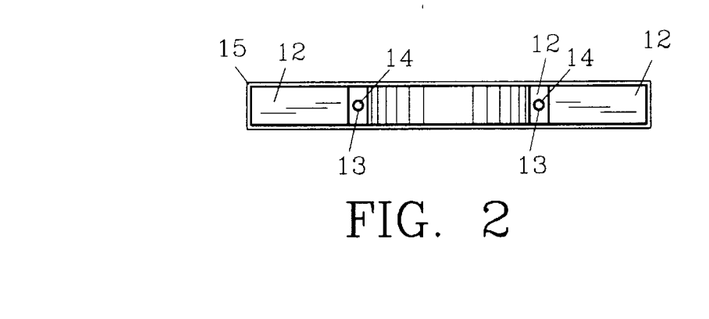
FIG. 2 illustrates a bottom plan view of the muntin along lines 2—2 of FIG. 1.

Turning now to the drawings, specifically FIGS. 1 and 2 show decorative window muntin 10, the preferred embodiment. Non-metal window muntin 10 is preferably machined from a 0.476 cm thick sheet of polystyrene, although other polymeric or non-metal materials such as polyurethane or wood may be acceptable, into a desired shape such as the radial display seen in FIG. 1, although other shapes and designs can be employed. Window muntin 10 includes a plurality of arms 11, each including end 12. Placed into each end 12 is cylindrical pin 13, which is preferably formed from aluminum 0.238 cm in diameter and 1.27 cm long. Pins 13 are received by cylindrical channels 14 which are preferably 0.238 cm in diameter and 0.635 cm deep, so that approximately one-half the length of each pin 13 extends from each channel 14. Pin 13 is centrally located on end 12 for optimum stability. Paint layer 15 (FIG. 2) completely surrounds and coats window muntin 10. Paint layer 15 is preferably conventional pigmented latex paint. It is within the scope of the present invention to use conventional clear or unpigmented sealants such as a polyurethane or other varnishes in place of paint 15.

Figure 3:
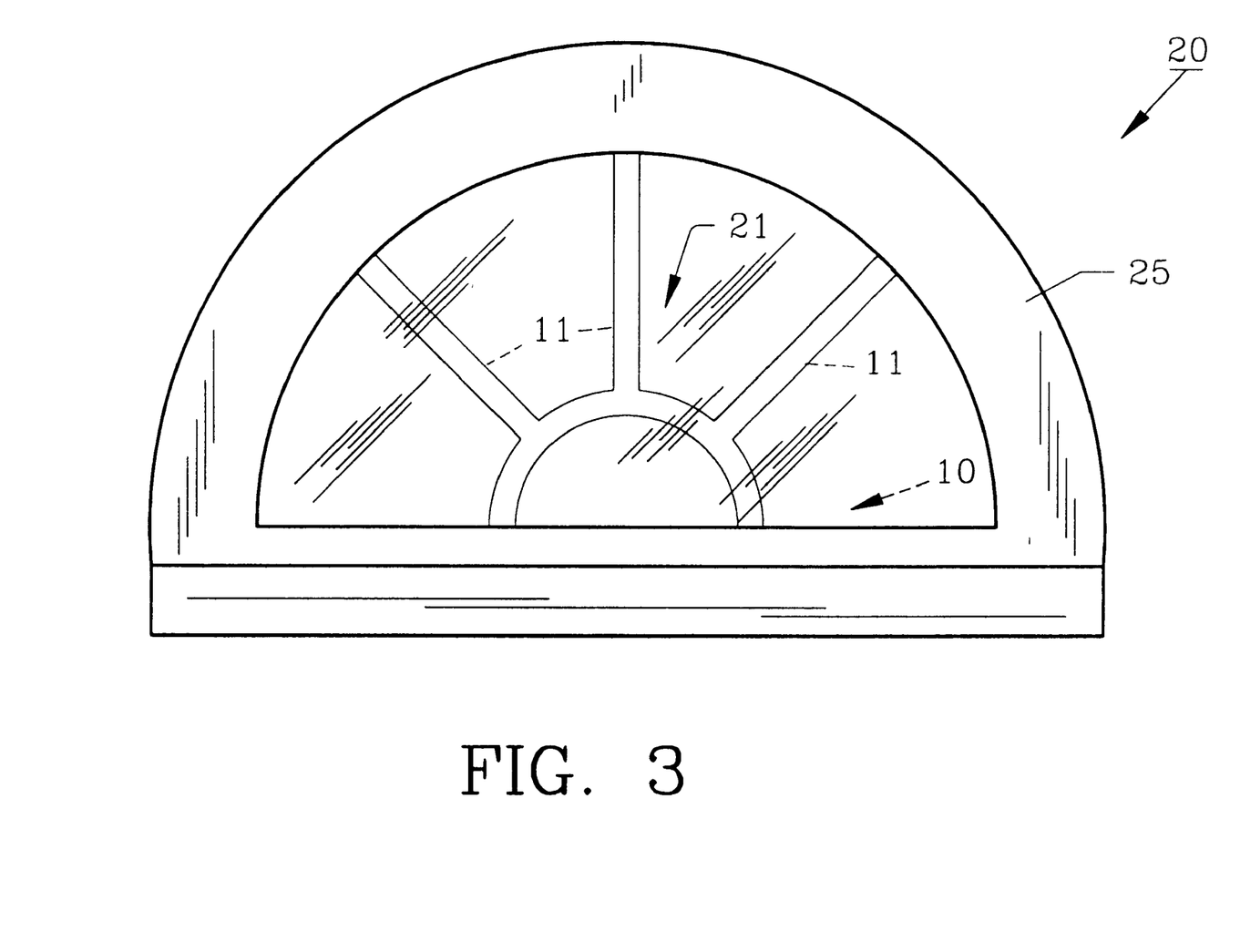
FIG. 3 demonstrates a front elevational view of the muntin of FIG. 1 mount between panes of glass in an IG window.
Figure 4:
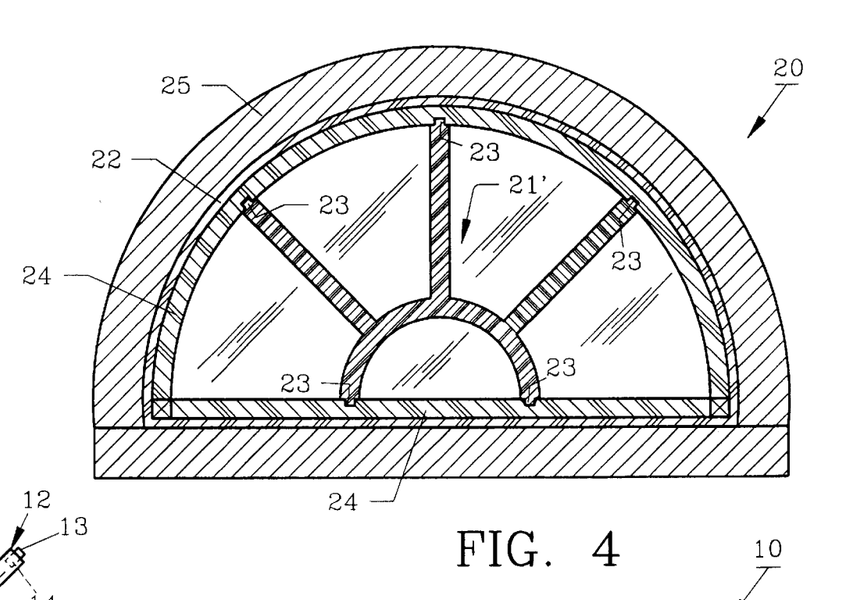
FIG. 4 features a cross-sectional view of the window of FIG. 3.

After window muntin 10 is painted and heat cured as explained in the preferred method below, it is ready to be placed in insulated window 20 as seen in FIGS. 3 and 4. Insulated window 20 comprises two parallel, opposing conventional glass plies 21 and 21' disposed in conventional wooden or aluminum window frame 25. Glass plies 21 and 21' are spaced one from the other by conventional sealant 22, such as a two part polyurethane finish which hermetically seals plies 21 and 21' together. Spacer 24, formed from rolled aluminum preferably from 1.27 cm to 1.905 cm thick hold plies 21 and 21' apart and is placed inside, but flush against sealant 22, and includes a number of cylindrical channels 23 equal to the number of pins 13 on muntin 10 and spaced around spacer 24 according to the location of pins 13 on muntin 10. Channels 23 are, preferably, 0.238 cm in diameter and 0.635 cm deep to accommodate pins 13 as best seen in FIG. 4. As can be easily understood, pins 13 hold muntin 10 in the proper position when placed and secured in channels 23 and 14. Spacer 24 and muntin 10 are sandwiched between glass plies 21 and 21' as sealant 22 hermetically seals muntin 10 therein as is conventional and well understood in the art.

Figures 5, 6:
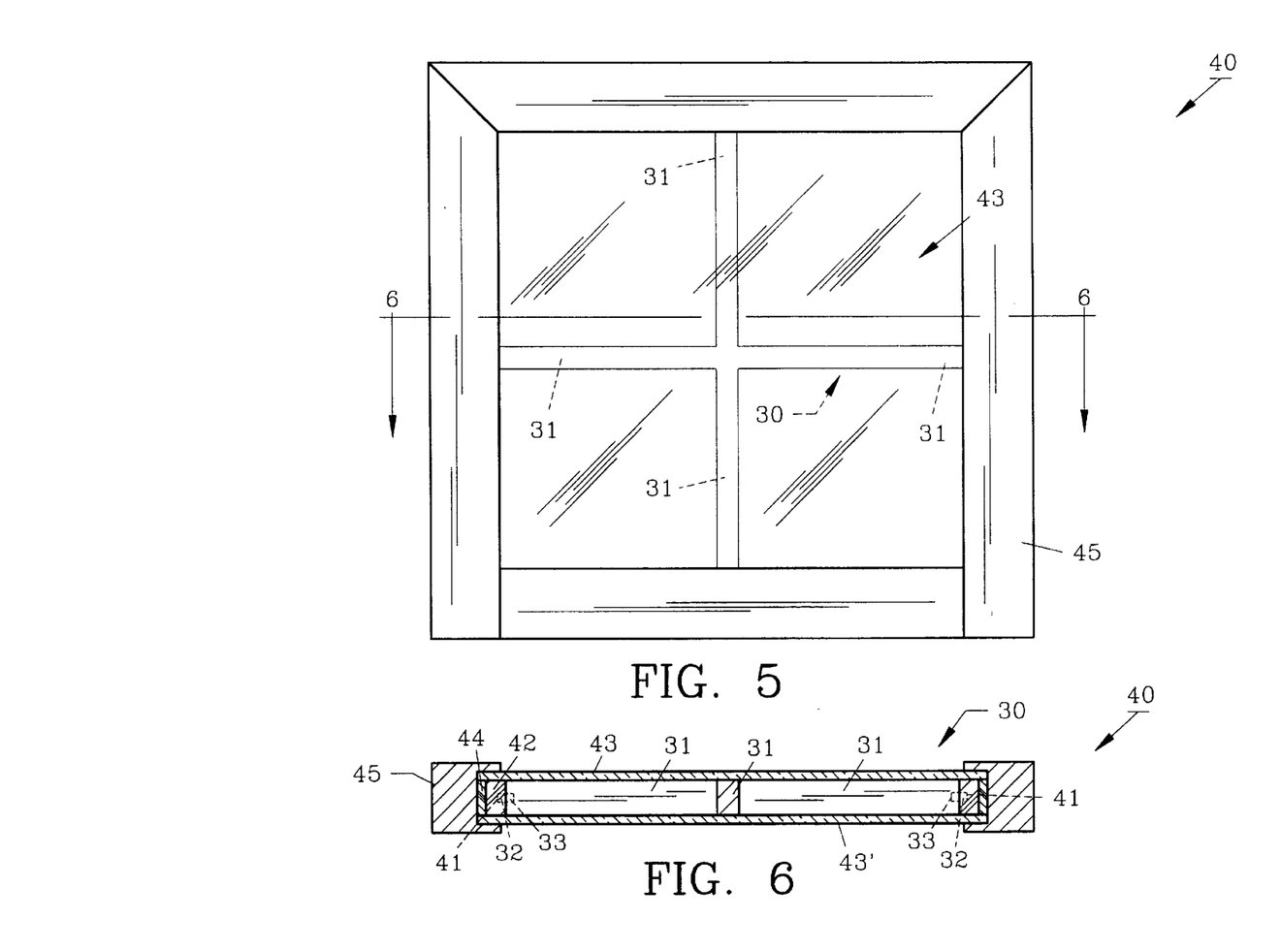
FIG. 5 depicts an alternate embodiment of a muntin in a pane of insulated glass mounted in a window.
FIG. 6 shows a cross-sectional view of the window of FIG. 5 along lines 6—6.

Window muntin 30, an alternate embodiment, is shown in FIGS. 5 and 6. Muntin 30 includes arms 31 with pins 32 much like muntin 10. Pins 32 fit into channels 33 of arms 31 and channels 41 of spacer 42. Glass plies 43 and 43' sandwich muntin 30 therebetween and are sealed with sealant 44. Frame 45 surrounds and obscures sealant 44 and spacer 42 from normal vision. Likewise, pins 32 are hidden from normal vision by muntin 30. It is to be understood, that while not shown, muntin 30 also has a layer of paint surrounding and sealing muntin 30 to prevent outgassing.

While only two embodiments of the present invention are shown, it is to be understood that any number of configurations or geometrically shaped windows, and muntins sized to fit such windows are possible and within the scope of the present invention. While glass is the preferred transparent ply, other plies such as polyacrylic, polycarbonates or the like may be used. The spacer would be resized and the channels in the spacer rod would be repositioned to accommodate the pins. Likewise, there is no particular muntin cross section preferred. A simple rectangle is shown in FIG. 2, but other conventional shapes are contemplated.

In the preferred method of making decorative window muntin 10, a cross section is chosen such as rectangular cross-section seen in FIG. 2. The dimensions of this cross-section are programmed into a conventional CAD program that can be downloaded into a three to five axis CNC router (not shown) such as those sold by CR Onsrud Inc. of Huntersvile, N.C. A planar sheet of high impact polystyrene, preferably 0.476 cm thick and of a size large enough to accommodate the desired pattern or configuration is placed on a cutting table (not shown) and secured. The cutting unit on the router is then engaged and the desired pattern is cut, so that an unfinished, machined muntin 10 is created.

Using a conventional electric drill (not shown) with a 0.238 cm diameter drill bit, channels 23 are drilled 0.635 cm deep into the center of ends 12 of muntin 10. Pins 13 are inserted and secured in ends 12 with a conventional adhesive. Muntin 10 is cleaned using a conventional solvent such as an ethyl or other alcohol solution to remove any dust or oils from the cutting procedures. Muntin 10 is then coated with a conventional water-based latex paint such that layer of paint 15 is formed thereon. This is preferably done in a conventional spray booth. All sides of muntin 10 should be so coated with a light to medium coat of paint and allowed to completely air dry.

After drying, muntin 10 is then preferably heat cured or baked at 220° F. or 104.4° C. for twenty to thirty minutes so as to force the gases contained within muntin 10 to be driven out or be sealed therewithin. By this procedure, only an extremely low percentage of volatiles remains which can later cause outgassing. Muntin 10 is then placed between two plies of glass 21 and 21' as earlier described and is hermetically sealed or sandwiched between plies of glass 21 and 21' for use in a conventional window, such as window 20.

The preceding recitation is provided as an example of the preferred embodiment and an alternate embodiment for illustrative purposes and is not meant to limit the nature or scope of the present appended claims. Variations of the invention are anticipated by those skilled in the art.

We claim:

1. A window comprising:
   two panes of glass and a unitary, non-metal polymeric decorative muntin, said muntin including at least three ends, said muntin comprising a heat cured coating layer, said muntin sandwiched between said panes and hermetically sealed therein.

2. The window as claimed in claim 1 wherein said muntin is polystyrene and said coating layer is latex paint.

3. The window as claimed in claim 1 further comprising a pin, said pin having a spacer end and an opposing attaching spine end, said spacer end of said pin is substantially perpendicular to said opposing attaching spine end and substantially flat, said spacer end being adapted to fit between said two panes of glass, said pin being removably attachable to said muntin by inserting said attaching spine end in a receiving channel in said at least one end of said muntin.

4. The window as claimed in claim 3 wherein said pin is plastic.

5. The window as claimed in claim 3 wherein said pin is aluminum.

6. A muntin for use in a window comprising a unitary, non-metal polymeric planar member having at least three ends, said planar member adaptable to conform to the window, and a heat cured coating, said heat cured coating covering said planar member, wherein said heat cured coating prevents the escape of remaining volatiles from said planar member upon heating.

7. The muntin of claim 6 formed from polystyrene.

8. The muntin of claim 6 wherein said coating is latex paint.

9. The muntin of claim 6 formed from polyurethane.

10. The window as claimed in claim 6 further comprising a pin, said pin having a spacer end and an opposing attaching spine end, said spacer end of said pin is substantially perpendicular to said opposing attaching spine end and substantially flat, said spacer end being adapted to fit between said two panes of glass, said pin being removably attachable to said planar member by inserting said attaching spine end in a receiving channel in an end of said planar member.

11. The window as claimed in claim 10 wherein said pin is plastic.

12. The window as claimed in claim 10 wherein said pin is aluminum.

13. A muntin for use in a window, comprising a unitary, non-metal polymeric planar member having at least three ends, including volatile gas-forming compounds, said planar member adaptable to conform to the window, a heat cured coating covering said planar member, wherein said coating prevents the escape of volatiles from said planar member upon heating during use.

* * * * *

(12) EX PARTE REEXAMINATION CERTIFICATE (6168th)
United States Patent
Reeder et al.

(10) Number: US 6,415,579 C1
(45) Certificate Issued: Apr. 1, 2008

(54) WINDOW, MUNTIN AND METHOD

(75) Inventors: Steven L. Reeder, Salisbury, NC (US); Michael A. Reeder, Salisbury, NC (US)

(73) Assignee: Custom Glass Products of Carolina, Inc., Salisbury, NC (US)

Reexamination Request:
No. 90/006,818, Oct. 20, 2003

Reexamination Certificate for:
Patent No.: 6,415,579
Issued: Jul. 9, 2002
Appl. No.: 09/407,034
Filed: Sep. 27, 1999

Related U.S. Application Data (62) Division of application No. 08/957,498, filed on Oct. 24, 1997, now Pat. No. 5,980,667.

(51) Int. Cl.
*E04C 2/54* (2006.01)
*E60B 3/68* (2006.01)

(52) U.S. Cl. .................. 52/786.13; 52/456; 52/204.6; 52/730.3; 52/734.2

(58) Field of Classification Search .............. None
See application file for complete search history.

(56) References Cited

U.S. PATENT DOCUMENTS

| | | | |
|---|---|---|---|
| 3,308,593 A | 3/1967 | Smith | |
| 3,358,412 A | * 12/1967 | Martin | 52/456 |
| 3,411,258 A | * 11/1968 | Kessler | 52/456 |
| 3,716,164 A | 2/1973 | Fennema | |
| 3,946,531 A | 3/1976 | Armstrong | |
| 4,204,015 A | 5/1980 | Wardlaw et al. | |
| 4,222,210 A | 9/1980 | Hanstein et al. | |
| 4,305,982 A | 12/1981 | Hirsch | |
| 4,348,435 A | 9/1982 | Mistrick et al. | |
| 4,358,490 A | 11/1982 | Nagai | |
| 4,430,836 A | 2/1984 | McKann | |
| 4,437,284 A | * 3/1984 | Cribben et al. | 52/456 |
| 4,475,311 A | * 10/1984 | Gibson | 49/176 |
| 4,563,846 A | 1/1986 | Webb | |
| 4,686,121 A | 8/1987 | Rogalla | |
| 4,783,938 A | 11/1988 | Palmer | 52/456 |
| 4,791,010 A | 12/1988 | Hanley et al. | |
| 4,989,384 A | 2/1991 | Kinghorn et al. | |
| 5,048,252 A | * 9/1991 | Osborn | 52/456 |
| 5,088,307 A | 2/1992 | Cole | |
| 5,099,626 A | 3/1992 | Seeger | 52/314 |
| 5,131,199 A | 7/1992 | Clark | |
| 5,274,976 A | 1/1994 | Burkhart | 52/456 |
| 5,315,797 A | 5/1994 | Glover et al. | 52/171.3 |
| 5,345,743 A | 9/1994 | Baier | 52/455 |
| 5,410,841 A | 5/1995 | Harris et al. | |
| 5,440,847 A | * 8/1995 | Butler | 52/311.1 |
| 5,456,048 A | 10/1995 | White | 52/204.61 |
| 5,465,539 A | * 11/1995 | Rose | 52/204.53 |
| 5,494,715 A | * 2/1996 | Glover | 428/34 |
| 5,555,989 A | 9/1996 | Moran, Jr. | |
| D374,485 S | 10/1996 | Brown | |
| 5,630,306 A | 5/1997 | Wylie | 52/786.13 |

(Continued)

FOREIGN PATENT DOCUMENTS

| CA | 349611 | 4/1935 |
|---|---|---|
| CA | 793040 | 8/1968 |

OTHER PUBLICATIONS

Plastics Finishing and Decoration, Copyright 1986, Van Nostrand Reinhold Company Inc. ISBN: 0–442–28062–9, Chapter 8, pp. 130–145; Chapter 31 pp. 477–485.*

Plastics: Surface and Finish, $2^{nd}$ Edition, Copyright 1993, Royal Society of Chemistry ISBN: 0–85186–209–8, Chapter 12, pp. 210–221.*

(Continued)

*Primary Examiner*—Aaron J. Lewis (57) ABSTRACT

A non-metal window muntin formed from plastic or wood is described for use in hermetically sealed insulated glass windows. The process for forming the muntin includes machining polystyrene sheets which are painted with a latex [pain] *paint* and baked prior to use between sealed [glass] *glasses* of the window.

U.S. PATENT DOCUMENTS

| | | | |
|---|---|---|---|
| 5,657,590 | A | 8/1997 | Digman et al. |
| 5,674,565 | A | 10/1997 | Kausch et al. ............... 427/258 |
| 5,860,346 | A | 1/1999 | McKeegan, Jr. et al. ... 83/471.3 |
| 5,899,033 | A | 5/1999 | Merchlewitz ............ 52/204.61 |
| 5,980,667 | A | 11/1999 | Reeder et al. |
| 6,035,597 | A | 3/2000 | Donaldson ................... 52/456 |
| 6,165,565 | A | 12/2000 | Schelhorn et al. |
| 6,311,455 | B1 | 11/2001 | Gerard ...................... 52/786.1 |
| 6,415,579 | B1 | 7/2002 | Reeder et al. |

OTHER PUBLICATIONS

Green home remodel, health homes for a healthy envirnment, King County Departmetn of Natural Resources and Parks, Aug. 2005.*

Fenestratiion magazine Jul./Aug. 1997, Ashlee Pub. Co. 182 41$^{st}$ Street, New York, NY 10017. (cited on U.S. Patent No. 5,980,667.

Kent, Dr. Gary, "Prepaint Treatment of Plastics", Products Finishing Magazine, Aug. 1993, pp. 58–65.

Custom Glass' Complaint against Collins Custom Millworks et al. dated Jun. 17, 2003 (25 pages).

Answer and Counterclaim dated Jul. 23, 2003 (14 pages).

Answer to Counterclaim dated Aug. 14, 2003 (5 pages).

Defendants Collins Custom Mill Work, Inc. and Defendant Thomas L. Collins, Sr. Initial Disclosures dated Aug. 25, 2003 (8 pages).

Thomas L. Collins, Sr.'s Responses and Objections to Plaintiff's First Request for Production of Documents and Other Things dated Sep. 29, 2003 (18 pages).

Collins Custom Mill Works, Inc.'s Responses and Objection to Plaintiff's First Request for Production of Documents and Other Things dated Sep. 29, 2003 (25 pages).

Collins Custom Mill Works, Inc.'s Supplemental Response and Objections to Plaintiff's First Request for Production of Documents and Other Things to Collins Custom Mill Work, Inc. dated Oct. 10, 2003 (28 pages).

Thomas L. Collins, Sr.'s Supplemental Response and Objections to Plaintiff's First Request for Production of Documents and Other Things to Thomas L. Collins, Sr. dated Oct. 10, 2003 (23 pages).

Thomas L. Collins, Sr.'s Supplemental Response to Plaintiff's First Interrogatories to Defendant Thomas L. Collins, Sr. dated Oct. 10, 2003 (22 pages).

Defendant Collins Custom Mill Work, Inc.'s Supplemental Response to Plaintiff's First Interrogatories to Defendant Collins Custom Mill Works, Inc. dated Oct. 10, 2003 (22 pages).

Answer and Counterclaim to Amended Complaint dated Oct. 27, 2003 (20 pages).

Plaintiff's Responses and Objections to Defendants' First Interrogatories to Plaintiff Custom Glass Products of Carolina, Inc. dated Jan. 16, 2004 (18 pages).

Plaintiff's Responses and Objections to Defendants' First Request for Production of Documents and Things to Plaintiff Custom Glass Products of Carolina, Inc. dated Jan. 16, 2004 (24 pages).

Plaintiff's Responses and Objections to Defendants' Second Request for Production of Documents and Things to Plaintiff Custom Glass Products of Carolina, Inc. dated Jan. 16, 2004 (8 pages).

Plaintiff's Responses and Objections to Defendants' First Request for Admission to Plaintiff Custom Glass Products of Carolina, Inc. dated Jan. 16, 2004 (17 pages).

Defendant Thomas L. Collins, Sr.'s Response to Second Interrogatories to Defendant Thomas L. Collins, Sr. dated Jan. 16, 2004 (12 pages).

Defendant Collins Custom Mill Work, Inc.'s Response to Plaintiff's Second Interrogatories to Defendant Custom Mill Works, Inc. dated Jan. 16, 2004 (9 pages).

Defendant Thomas L. Collins' Response and Objections to Plaintiff's First Request for Admissions to Defendant Mr. Thomas L. Collins, Sr. dated Jan. 16, 2004 (15 pages).

Defendant Collins Custom Mill Works, Inc.'s Response and Objections to Plaintiff's First Request for Admissions to Defendant Collins Custom Mill Works, Inc. (12 pages).

Defendant Thomas L. Collins, Sr.'s Response and Objections to Plaintiff's Second Request for Production of Documents and Other Things to Defendant Thomas L. Collins, Sr. dated Jan. 16, 2004 (6 pages).

Defendant Collins Custom Mill Works, Inc.'s Response and Objections to Plaintiff's Third Request for Production of Documents and Other Things to Defendant Collins Custom Mill Works, Inc. dated Jan. 16, 2004 (6 pages).

Order Staying Action dated Feb. 9, 2004 (2 pages).

Deposition of Virginia R. Collins, vol. I, taken on Oct. 21, 2003 (279 pages).

Deposition of Thomas L. Collins, Sr., vol. I, Part I, taken on Feb. 2, 2004 (60 pages).

Deposition of Thomas L. Collins, Sr., vol. I, Part II, taken on Feb. 2, 2004 (292 pages).

Rule 30(b)(6) Deposition of Collins Custom Millworks (Thomas Loren Collins, Jr.) taken on Feb. 3, 2004 (324 pages).

Deposition of Thomas Loren Collins, Jr. taken on Feb. 11, 2004 (57 pages).

Deposition of Thomas Loren Collins, Jr. taken on Oct. 22, 2003 (276 pages).

Deposition of Carlos Deupree taken on Nov. 19, 2003 (98 pages).

Custom Glass' First Amended Complaint Against Collins Custom Millworks et al (30 pages).

Plaintiff's Initial Disclosures (5 pages).

Plaintiff's Amended Initial Disclosures (5 pages).

Infini–Lite's Declaratory Judgment Complaint Against Custom Glass dated Dec. 21, 2004 (7 pages).

Custom Glass' Answer and Counterclaim For Patent Infringement dated Jan. 25, 2005 (26 pages).

Defendants Disclosure Statement dated Jan. 25, 2005 (4 pages).

Inifini–Lite's Reply to Counterclaim dated Feb. 21, 2005 (13 pages).

Order Staying Action dated Apr. 11, 2005 (4 pages).

Bower, John, "Windows", "Green Alternatives", Nov./Dec. 1992, pp. 26–27.

"Paint and Powder Curing", Product Finishing Magazine, Aug. 1993, pp. 76–84.

Schrantz, Joe, "IR Ovens Go with the Gold", "Industrial Paint and Powder", Nov. 1993, pp. 25–26.

Triplett, Tim, "The Cure for the Common Coating", "Industrial Paint & Powder", Sep. 1995, pp. 18–20.

Bailey, Jane M., "Plastics Painting Makes a Splash at Polaris", "Industrial Paint & Powder", Jul. 1996, pp. 14–16.

Bailey, Jane M., "Waterborne Wows Wood Finishers", "Industrial Paint & Powder", Oct. 1996, pp. 18–21.

Bailey, Jane M., "Painting Plastic Wheel Covers", "Industrial Paint & Powder", Nov. 1996, pp. 16–19.

Stoye, Dieter, "Paints, Coatings and Solvents", 1993, pp. 213–215.

Reeder et al., 5,980,667 response dated Mar. 8, 1999 to Office Action Dated Jan. 5, 1999.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, and 13 are determined to be patentable as amended.

Claims 2–5 and 7–12, dependent on an amended claim, are determined to be patentable.

New claims 14 and 15 are added and determined to be patentable.

1. A window comprising:
   two panes of glass and a unitary, *one-piece construction having no connecting joints,* non-metal polymeric decorative muntin, said muntin including at least three ends,
   said muntin comprising a heat cured coating layer *on all sides of the muntin that keeps vapors caused by heating from escaping the muntin,*
   said muntin sandwiched between said panes and hermetically sealed therein.

6. A muntin for use in a window comprising:
   a unitary, *one-piece construction having no connecting joints,* non-metal polymeric planar member having at least three ends, said planar member adaptable to conform to the window, *said planar member having volatile forming compounds,*
   and a heat cured coating, said heat cured coating covering said planar member *on all sides*, wherein said heat cured coating prevents the escape of remaining volatiles from said planar member upon heating *to a temperature sufficient to vaporize the volatile forming compounds.*

13. A muntin for use in a window, comprising:
   a unitary, *one-piece construction having no connecting joints,* non-metal polymeric planar member having at least three ends, including volatile gas-forming compounds, said planar member adaptable to conform to the window,
   a heat cured coating covering *all sides of* said planar member, wherein said coating prevents the escape of volatiles from said planar member upon heating during use *to a temperature sufficient to vaporize volatile gas forming compounds,* and
   *said coated muntin configured to contain vapors when heated to a point sufficient to vaporize volatile gas forming compounds.*

*14. A window comprising:*
   *a hermetically sealed chamber comprising a first glass pane and a second glass pane substantially parallel to each other, the first glass pane and second glass pane being spaced apart from each other;*
   *a unitary, non-metal polymeric decorative one-piece muntin having no connecting joints and at least three ends, the muntin being between the first glass pane and second glass pane; and*
   *a heat cured coating layer covering the muntin on all sides that prevents out gassing from the muntin when the muntin is heated, wherein the hermetically sealed chamber is configured to be heated to a temperature sufficient to vaporize volatile gas forming compounds.*

*15. A window comprising:*
   *a hermetically sealed chamber comprising a first glass pane and a second glass pane substantially parallel to each other, the first glass pane and second glass pane being spaced apart from each other;*
   *a unitary, non-metal polymeric decorative one-piece muntin having no connecting joints and at least three ends, the muntin being between the first glass pane and second glass pane; and*
   *a heat cured coating layer covering the muntin on all sides that prevents out gassing from the muntin when the muntin is heated, wherein the hermetically sealed chamber is configured to be heated by ultra violate radiation through at lease one of the first glass pane or second glass pane to a temperature to vaporize volatile gas forming compounds.*

\* \* \* \* \*